Dec. 31, 1935. T. H. WILLIAMS 2,026,487
MOLD ENGRAVING MACHINE
Filed Aug. 29, 1934 6 Sheets-Sheet 1

INVENTOR
THOMAS H. WILLIAMS
BY
ATTORNEYS

Dec. 31, 1935.   T. H. WILLIAMS   2,026,487
MOLD ENGRAVING MACHINE
Filed Aug. 29, 1934   6 Sheets-Sheet 2
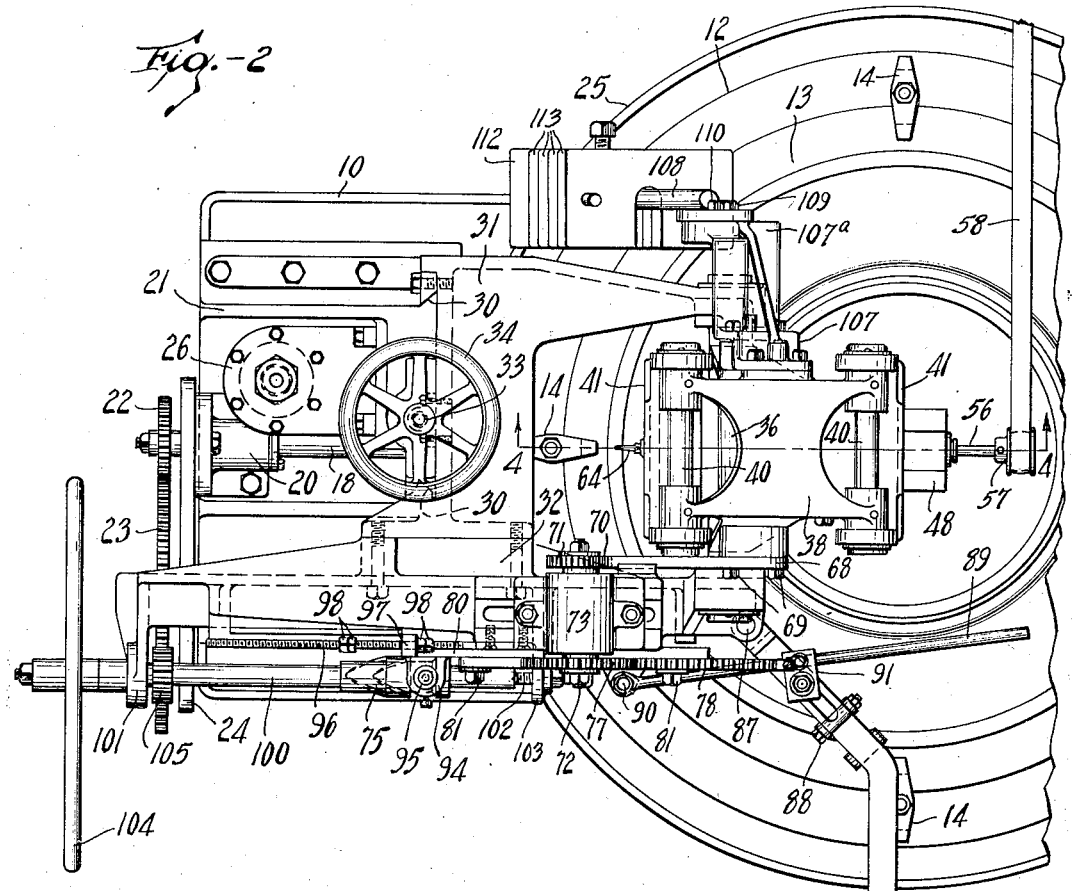
INVENTOR
THOMAS H. WILLIAMS.
BY Ely & Barrow
ATTORNEYS Dec. 31, 1935.     T. H. WILLIAMS     2,026,487
MOLD ENGRAVING MACHINE
Filed Aug. 29, 1934     6 Sheets-Sheet 4

INVENTOR
THOMAS H. WILLIAMS
BY Ely & Barrow
ATTORNEYS

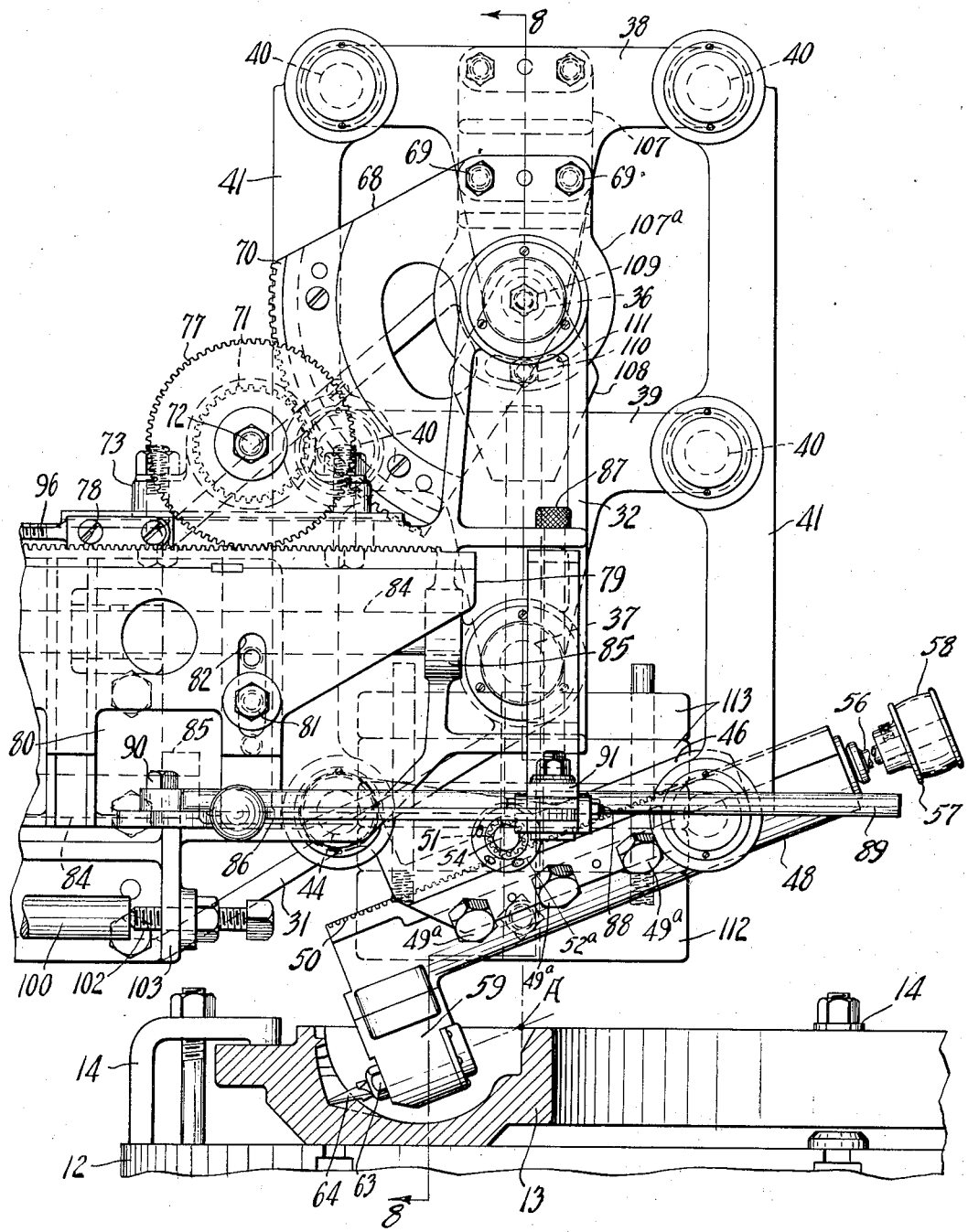

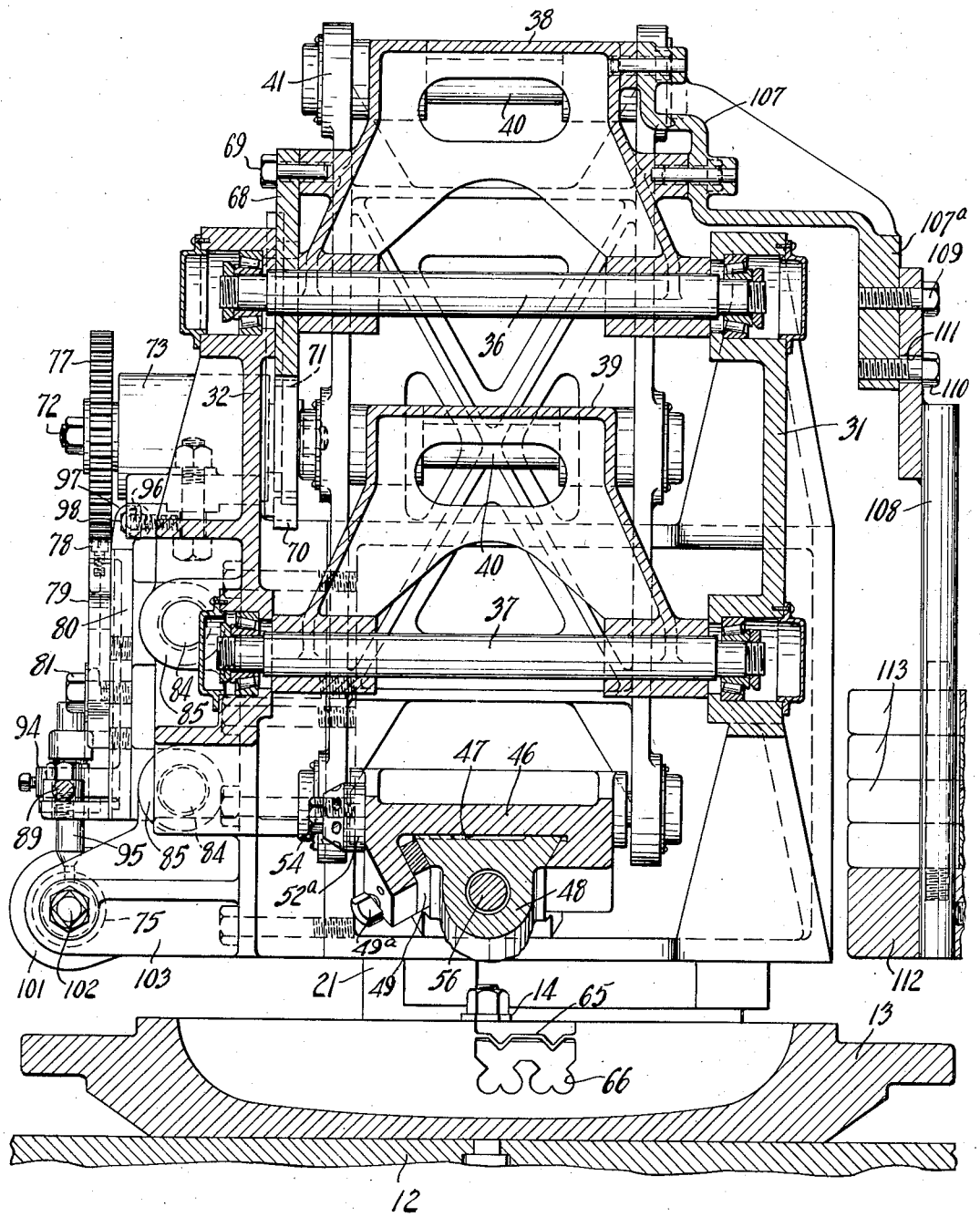

Patented Dec. 31, 1935

2,026,487

UNITED STATES PATENT OFFICE 2,026,487

MOLD ENGRAVING MACHINE

Thomas H. Williams, Akron, Ohio, assignor to National Rubber Machinery Company, Akron, Ohio, a corporation of Ohio Application August 29, 1934, Serial No. 741,937

14 Claims. (Cl. 90—13.7)

This invention relates to mold engraving machines, and more especially it relates to machines for engraving non-skid patterns in the cavities of molds in which pneumatic tire casings are formed and vulcanized.

In tire molds of the character described, the portion thereof that molds the tread portion of the tires has a transverse, peripheral curvature that is generated about an axis lying in the central plane of the mold, usually within the tire molding cavity and adjacent the inner periphery thereof. In some cases the transverse contour of the tread includes a curved surface generated from an axis disposed at one side of the central plane of the mold, and within the cavity of the mold section that includes said curved surface. In either case, the engraving of said curved surfaces in the mold requires that the engraving tool oscillate about the axis of the respective curves, which heretofore has presented no problem for the reason that the inner peripheries of the tire molds did not extend to the central plane of the molds, but were substantially cut away at each side thereof to accommodate bead-clamping rings that were applied to tires before the tires were mounted in the molds. It is now proposed to discontinue the use of bead-clamping rings in the molding and vulcanizing of pneumatic tire casings and to extend the inner peripheral portions of the tire mold sections to the central plane of the mold, with the result that said inner peripheral portions of the mold will occupy space previously occupied by the engraving tool while engraving non-skid characters in the outer periphery of the mold cavity.

The chief object of the invention is to provide a mold engraving machine capable of engraving the outer periphery of the molding cavity in a tire mold section that has its inner peripheral wall extending to or substantially to the central plane of the mold. A more specific object is to provide an engraving machine wherein the engraving tool oscillates about an axis that is disposed exteriorly of the machine. Other objects will be manifest as the specification proceeds.

Of the accompanying drawings,

Figure 2 is a plan view thereof;

Figure 3 is a section, on a larger scale, on the line 3—3 of Figure 1 and Figure 4;

Figure 7 is a fragmentary elevation, on a larger scale, of apparatus shown in Figure 1, in another of its operative positions; and Figure 8 is a section on the line 8—8 of Figure 7.

Figure 1:
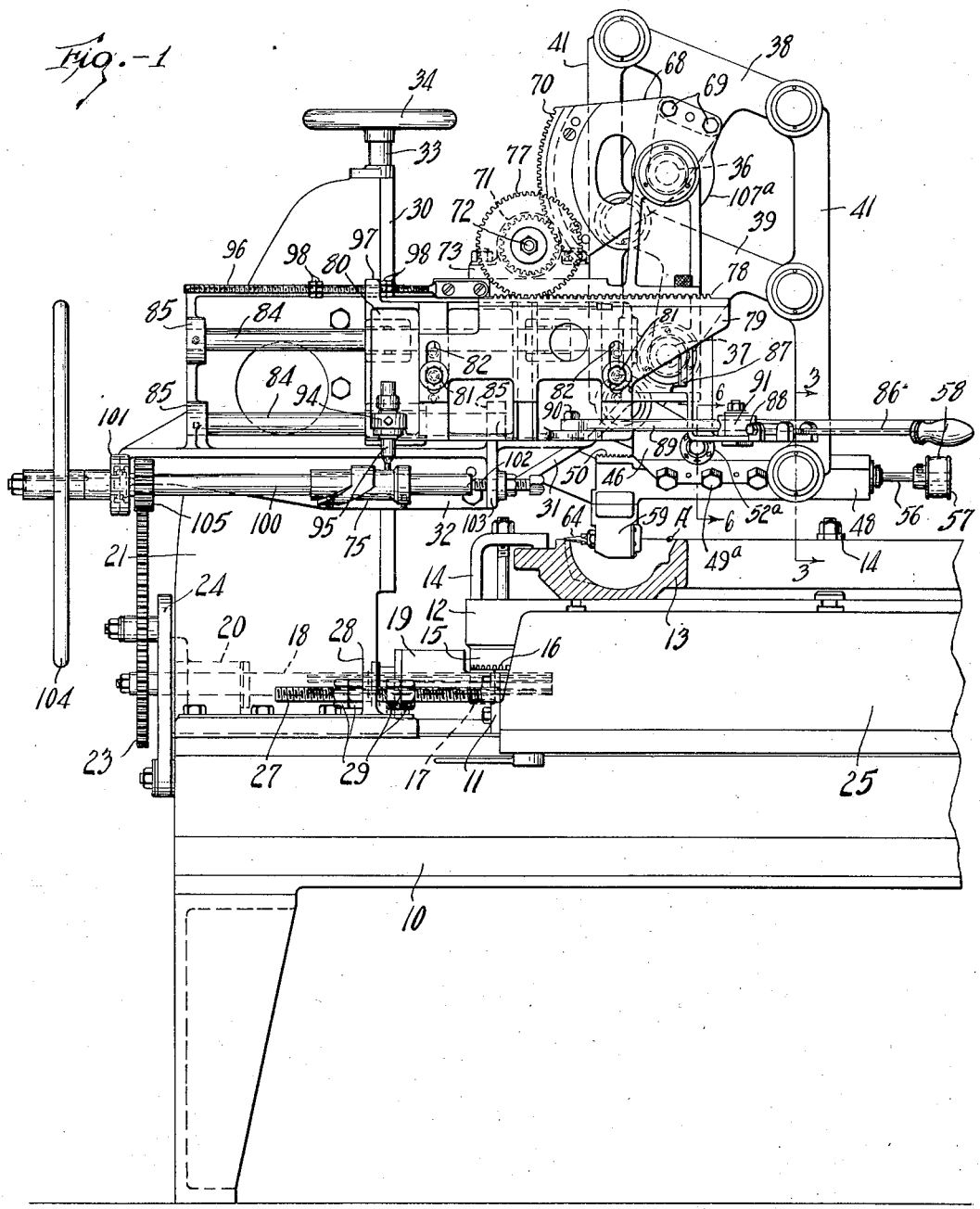
Figure 1 is a side elevation of apparatus embodying the invention in its preferred form, in one of its operative positions, and the work therein, the latter being broken away and in section.

Referring to Figure 1 of the drawings, 10 is a suitable table or base upon which is mounted a carriage or saddle 11, the latter being arranged for movement longitudinally of the table and supporting a turntable 12. The turntable 12 supports the work which is shown herein as half of a tire mold 13 which is secured to the turntable by a plurality of the usual clamps 14. The turntable 12 is formed with a depending, circumferential flange 15 that has its bottom face formed with gear teeth 16 that mesh with a pinion 17 that is splined on a shaft 18, the latter being journaled in a bearing bracket 19 carried by carriage 11 and a bearing bracket 20 that is mounted upon the base of a vertical standard 21 that rises from the table 10 at one end thereof. The outer end of shaft 18 is provided with a gear 22, Figure 2, that is meshed with an idler pinion 23 that is carried by a suitable supporting bracket 24 secured to the end face of table 10. Pinion 23 is rotated by means subsequently to be described whereby turntable 12 and the work 13 thereon are turned angularly upon carriage 11. An upstanding flange 25 on the latter substantially circumscribes the turntable and protects the gear teeth 16 thereon. A fluid pressure operated cylinder 26, Figure 2, is provided for moving the carriage 11 with turntable and work thereon longitudinally of table 10. A threaded spindle 27 is mounted on one end of carriage 11 and extends horizontally therefrom through an aperture formed in an ear 28 on standard 21. Lock-nuts 29, 29 threaded onto spindle 27 on opposite sides of ear 28 adjustably limit the normal movement of carriage 11, said lock-nuts normally being so positioned as to permit such movement of the carriage 11 as will move the work 13 into and out of operative engagement with an engraving tool presently to be described.

The side of standard 21 that faces turntable 12 is formed with a vertical dovetail slideway 30 upon which is mounted a vertically adjustable slide or head comprising a main section 31, and a lateral section 32 secured to the near side thereof as viewed in Figures 1, 2, and 7. The position of adjustment of said head is controlled by a vertical screw shaft 33 that is journaled in standard 21, the upper end of said screw shaft being provided with the usual operating hand-wheel 34.

Portions of the respective head-sections 31, 32 overhang the adjacent portions of turntable 12 and work 13 thereon, and journaled at their respective ends in said overhanging portions of the head are respective upper and lower rock-shafts 36, 37, said rock-shafts being horizontally disposed and parallel to each other in the same vertical plane. Mounted upon upper rock-shaft 36 is a relatively wide upper bell crank 38 consisting of a long arm and a short arm perpendicular thereto, the outer end of said short arm being fixedly secured to rock-shaft 36 at two points thereon, as is most clearly shown in Figure 8, the long arm of the bell crank being disposed above the bell crank. A substantially similar lower bell crank 39 is similarly mounted on lower rock-shaft 37. Fixedly mounted in the opposite ends of the long arms of the upper and lower bell cranks 38, 39 are respective shafts 40, 40, and pivotally mounted on each vertical pair of said shafts, on opposite sides of rock-shafts 36, 37, is a wide, truss-like link 41. The arrangement is such that links 41 always are vertically disposed and parallel to each other, and move up and down and from and toward the rock-shafts 36, 37 in unison, and reversely of each other, as bell crank 38 moves angularly about rock-shaft 36 as the latter is oscillated.

The links 41 extend downwardly below lower bell crank 39, and at its lower end the link 41 disposed nearest head 31 has a shaft 44 journaled therein, which shaft is parallel to and in the same vertical plane as the shafts 40 that support the link, the shaft 44 and adjacent shaft 40 being the same distance apart as the two shafts 40. Similarly located at the lower end of the other link 41 are stub shafts 45, 45, Figure 3, that are journaled coaxially in opposite sides of the link. Supported upon and secured to shaft 44 and stub shafts 45 is a spindle-supporting bracket 46 that connects the lower ends of links 41. The bottom face of bracket 46 is formed with a longitudinally extending dove-tail slideway 47 that is obliquely disposed with relation to a plane extending through shaft 44 and stub shafts 45, said slideway sloping downwardly in the direction looking toward shaft 44. Mounted in slideway 47 of bracket 46 is a sleeve 48 that is retained therein by the usual gib 49. Formed locally along one margin of the top face of sleeve 48 is a rack 50 that is meshed with a gear pinion 51 formed on a quill 52 that is journaled in a suitable bore 53 extending into bracket 46 from one lateral face thereof, said quill being retained in said bore by a suitable bolt 54 and formed exteriorly of the bracket with an enlarged head 52ª that is suitably recessed to receive a turning tool. By turning head 52ª, pinion 51 is caused to move sleeve 48 longitudinally in its slideway 47 for purpose of adjustment as presently will be explained, the adjustment being effected while the set screws 49ª, which hold gib 49 in place, are loosened.

Journaled in suitable bearings in sleeve 48 is a longitudinally disposed spindle 56 that projects from the sleeve at the end thereof remote from head 31, and mounted on said projecting end portion is a driving pulley 57 by which the spindle 56 is driven, by a transmission belt 58, from a suitable source of power (not shown). The opposite end portion of sleeve 48 is formed on its under side with a small housing comprising a cap 59, the spindle 56 extending into said housing and being provided thereat with a gear 60. The gear 60 meshes with an idler pinion 61 that in turn is meshed with a gear 62 mounted upon a counter-spindle 63, the latter and the pinion 61 being suitably journaled in said sleeve housing. The counter-spindle 63, which is disposed parallel to spindle 56, projects from the sleeve housing on the side thereof nearest the head 31 and has an axial bit 64 removably mounted in its exposed end, said bit constituting a tool for engraving the work 13. The arrangement is such that the bit 64 is substantially axially offset from the spindle 56. The housing on the end of sleeve 48 is relatively small as compared to the entire sleeve whereby said housing can enter a relatively small space, such as the molding cavity in the mold section 13, to permit the tool 64 to engrave non-skid designs or characters therein, an example of said characters being shown at 65, 66, Figure 8.

Figure 4:
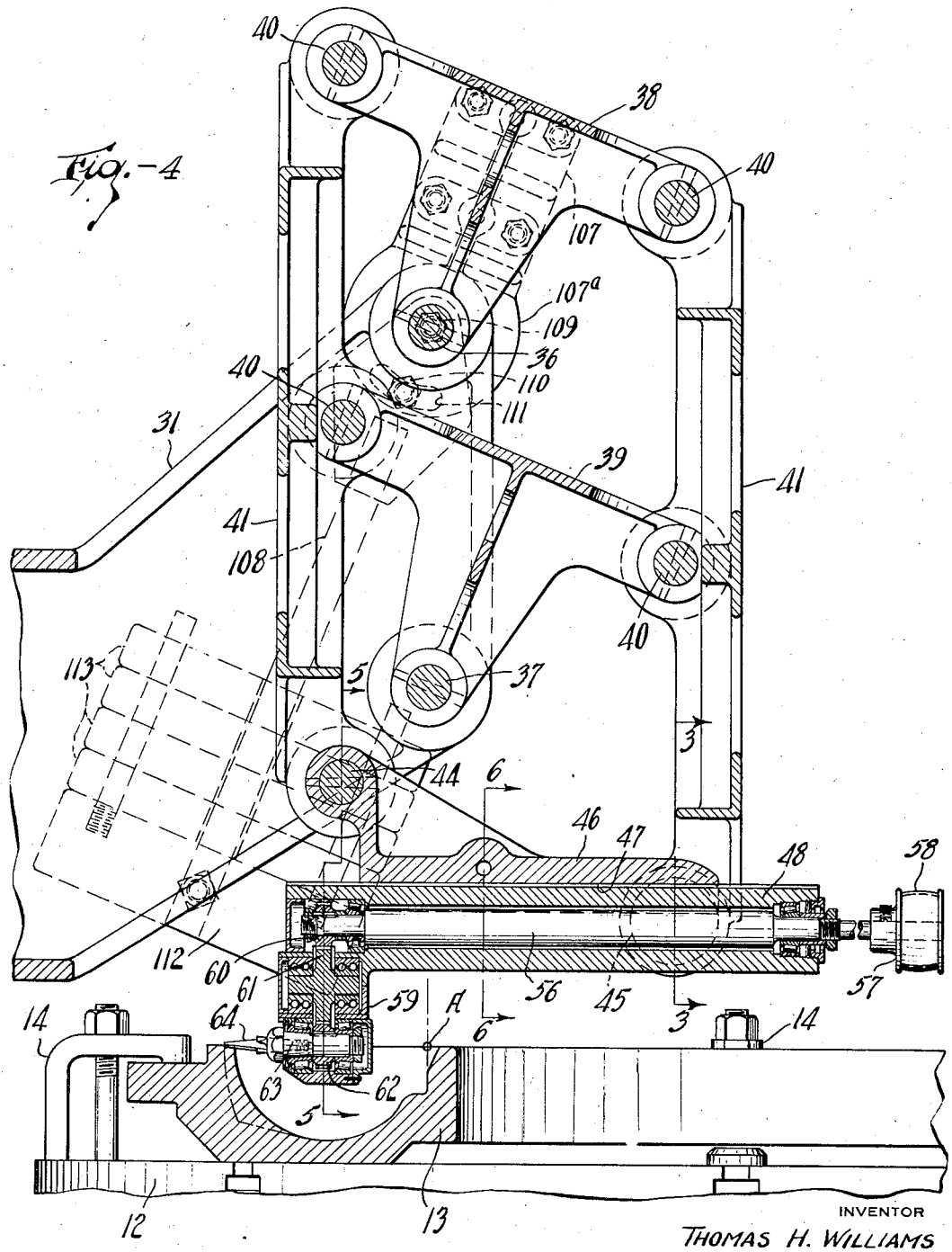
Figure 4 is a section, on a larger scale, on the line 4—4 of Figure 2.
Figure 5:
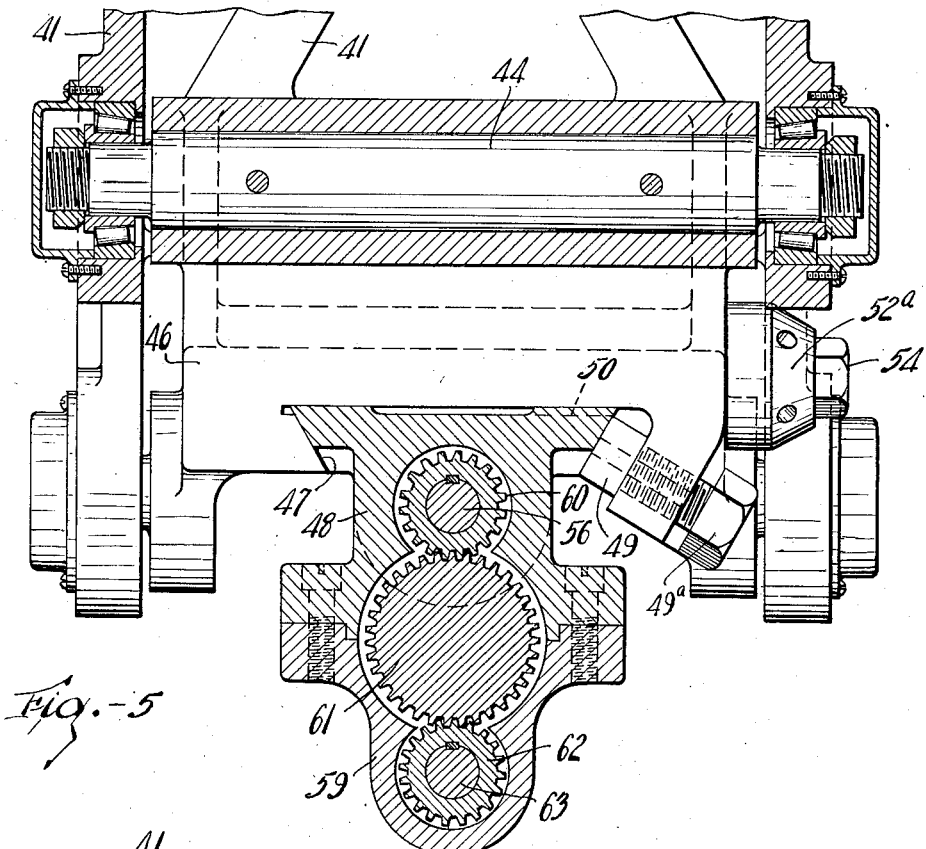
Figure 5 is a section, on a larger scale, on the line 5—5 of Figure 4.
Figure 6:
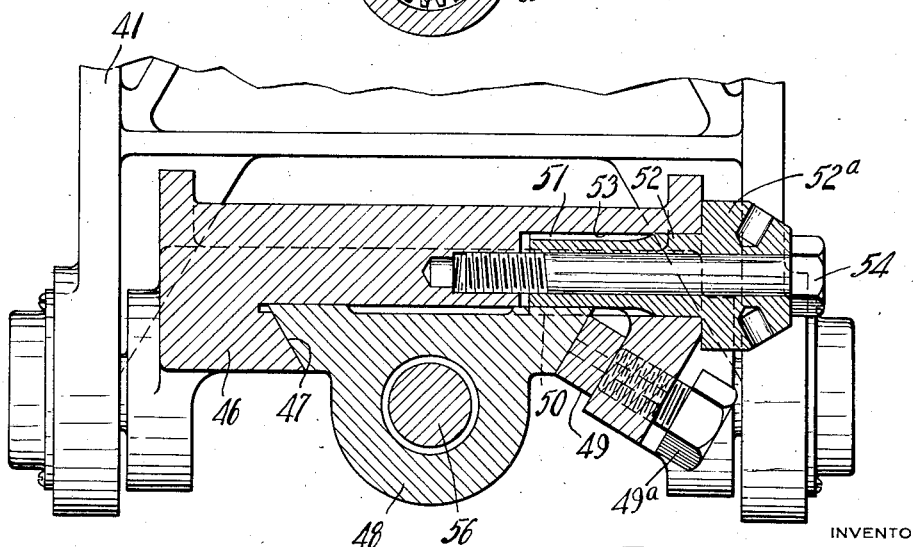
Figure 6 is a section, on a larger scale, on the line 6—6 of Figure 4.

Parallel movement of the links 41 tilts the sleeve 48 to different angular positions as will be observed from a comparison of Figure 4 with Figure 7, whereby the transversely arcuate tread-molding surface of the molding cavity of the mold 13 is engraved. Since the shaft 44 and stub shafts 45 are in the same vertical planes as the respective vertical pairs of shafts 40, it follows that the parallel movement of links 41 imparts to the spindle-bracket 46 an angular movement that is similar to the angular movement of bell cranks 38, 39, and that said spindle-bracket moves about an axis that is in the same vertical plane as the axes of rock-shafts 36 and 37, said axis being indicated at A. The end housing on sleeve 48 is so constructed and arranged that the rotative axis of the bit 64 is disposed radially of and at right angles to the axis A, and by means of the adjusting quill 52 the sleeve 48 may be moved longitudinally so that the bit 64 may be adjusted axially, from or toward axis A. To engrave a tire mold cavity, the engraving apparatus is adjusted so that the axis A is coincident with the axis of the arcuate transverse contour of the tread-molding portion of the cavity, the arrangement being such that by effecting longitudinal adjustment of sleeve 48 as described, mold cavities of most any size may be engraved. The overall dimension of the sleeve-housing and bit 64, radially of axis A is almost always less than the transverse radius of the mold surface to be engraved so that said axis A will lie exteriorly of any of the mold engraving mechanism, and the latter may oscillate freely about said axis notwithstanding the proximity of the said axis to the inner peripheral wall of the mold section.

For effecting parallel movement of the links 41 for the purpose set forth, a quadrant or spider 68 is mounted upon rock-shaft 36 on the near side of bell crank 38 as shown in the drawings and secured to said bell crank by cap screws 69. Mounted upon quadrant 68, concentric with the axis of said rock-shaft, is a demountable gear segment 70 that is meshed with a gear 71 that is mounted upon one end of a shaft 72, the latter being journaled in a bearing bracket 73 that is adjustably mounted upon the upper margin of lateral section 32 of head 31. Gear 71 is known as a ratio gear for the reason that the ratio between gear 71 and gear segment 70 is exactly the same as the ratio between the size of the individual characters 65, 66 in mold section 13 and the circumference of a pattern or jig 75 that controls the design of said characters. The arrangement is such that a single jig may be utilized for engraving a plurality of molds having non-skid characters of different sizes simply by changing gear 71 and segment 70 to provide the proper ratio therebetween, the adjustable feature of bracket 73 making this possible.

Mounted upon the near end of shaft 72 is a gear 77 that is meshed with a rack 78 that is mounted upon the upper margin of a rack-plate 79, the latter being secured to the front face of a horizontally reciprocable carriage 80 by means of cap screws 81, 81 that extend through respective slots 82 in said rack-plate whereby vertical adjustability of the latter is effected. Gear 77 is known as a radius gear, its pitch diameter being the same as the radius of the transverse peripheral curvature in the mold cavity about axis A. When said radius changes, as when molds of different size or design are to be engraved, a different gear 77 is required, the adjustable feature of rack-plate 79 permitting this change of gears.

The carriage 80 is slidably mounted for longitudinal movement along a pair of horizontal guide rods 84, 84 that are supported in suitable brackets or ears 85 formed on the front face of the lateral section 32 of the head 31. For manually reciprocating the carriage 80, an elongate hand lever 86 is pivotally mounted at 87 on the lateral head-section 32, said hand lever comprising two parts that are hinged together at 88 so that the projecting end portion of the lever may be tilted upwardly out of the way when the machine is not in use. A link 89 is pivotally connected at 90 to the carriage 80 and extends through a block 91 that is pivotally mounted on the end portion of lever 86 that is nearest its pivot 87, the link being longitudinally adjustable in said block. The arrangement permits the hand lever to be angularly positioned for the greatest convenience of the operator.

Mounted for vertical adjustment in a bracket 94 that is formed on the front of carriage 80, at one end thereof near its lower margin, is a follower or pin 95 adapted for operative engagement with pattern or jig 75. The latter controls reciprocatory movement of the carriage 80 whereby the bit 64 is moved angularly about the axis A. In some situations it is not desired to utilize the entire surface of said jig so that other means require to be provided for limiting the reciprocatory movement of the carriage. To this end a horizontal, threaded rod 96 is mounted at one of its ends on head-section 32 and extends freely through an apertured lug 97 projecting upwardly from the upper margin of carriage 80. Adjustable nuts 98, 98 are threaded onto rod 96 on opposite sides of lug 97 and disposed thereon in proper position to limit the movement of carriage 80 by engagement with lug 97 thereof, as is most clearly shown in Figures 1 and 2.

The jig 75 is mounted for axial adjustment upon a jig-shaft 100 that is journaled adjacent one of its ends in a suitable bearing bracket 101 formed on head-section 32, the other end of said jig-shaft being axially engaged by the conical end of a set-screw 102 that is adjustably mounted in a bracket 103 formed on head-section 32. The end portion of the jig-shaft that projects beyond bracket 101 is provided with a hand-wheel 104 by which the said shaft is manually rotated, and said jig-shaft also carries a gear 105 that is meshed with idler pinion 23. The arrangement is such that turning of hand-wheel 104 concurrently rotates jig 75 and the work 13, the intervening gearing determining the length of the character 65 engraved in the mold for one revolution of the jig 75. The characters 66, Figure 8, are engraved by a jig (not shown) that may be mounted on jig-shaft 100 after a circumferential series of characters 65 have been engraved and the jig 75 has been removed.

To reduce the manual labor required for tilting the engraving tool from the position shown in Figure 4 to the position shown in Figure 7, suitable counter-weighting mechanism is provided. To this end an angular bracket 107 is mounted upon the rear of bell crank 38, as is most clearly shown in Figure 8, said bracket having a depending portion 107a that is disposed beyond the end of rock shaft 36. Extending downwardly from bracket 107 is an arm 108, which arm is secured to bracket portion 107a by a cap-screw 109 that is in axial alignment with rock-shaft 36, and a cap-screw 110 that extends through an arcuate slot 111 in said arm, said slot 111 being concentric with the axis of cap-screw 109. The arrangement is such that arm 108 may be adjusted angularly about the axis of rock-shaft 36, depending upon the work to be engraved so that it will be in vertical position at the limit of angular operative movement of the engraving bit 64. Secured to the lower end of arm 108 is a counterweight 112. Other smaller counter-weights 113, 113 are provided and may be superposed upon counterweight 112 as shown if it is desired to increase the leverage of arm 108.

In the operation of the machine, assuming that the proper ratio gear 71 and radius gear 77 have been provided for the jig 75 to be used and the mold to be engraved, and the sleeve 48 has been properly adjusted in bracket 46 to provide the proper radial positioning of bit 64 with relation to axis A, a tire mold 13 is mounted upon the turntable 12, concentrically thereof, and clamped in place. The carriage 11 is then moved to proper position and the lock nuts 29 are adjusted to permit the proper limited movement of said carriage. The head 31 with the engraving mechanism carried thereby is then lowered by means of hand-wheel 34, until the axis A of the bit 34 is coincident with the axis of the transverse curvature at the outer periphery of the cavity in the mold, the fluid pressure cylinder 26 being properly charged to position the mold 13 in proper operative position with relation to said bit. Power is then applied through the transmission belt 58 to drive the bit about its own axis. The engraving of the mold may then proceed in the usual manner, the operator using his left hand to manipulate hand-wheel 104 to rotate the work and the jig 75, and using his right hand to manipulate lever 86 to cause jig pin 95 to follow the contour of said jig, whereby the rotating bit 64 is caused to oscillate about axis A in conformity to the pattern on the jig, and the engraving of a circumferential series of characters 65 in the mold is effected.

The feature of having the engraving tool oscillate about a phantom axis, that is, an axis that exists in space entirely apart from the engraving mechanism, makes it possible mechanically to engrave surfaces that otherwise would be inaccessible, and greatly enlarges the field of utility of the machine.

Although the embodiment of the invention shown and described is adapted particularly for engraving tire molds, it will be understood that it may be adapted for use in other situations wherever it may be applied.

Modification may be restorted to without departing from the spirit of the invention or the scope of the appended claims.

What is claimed is:

1. In a machine of the character described, the combination of a rotatable engraving tool, means for rotating the same about its own axis, and means for oscillating the tool about an axis existing in space in the extended axis of the tool.

2. In a machine of the character described, the combination of a rotatable engraving tool, means for rotating the same about its own axis, means for oscillating the tool about an axis existing in space in the extended axis of the tool, and means for moving the tool from and toward said axis of oscillation.

3. In a machine of the character described, the combination of a rotatable tool, means for rotating the same about its own axis, and means for oscillating the tool about an axis which exists in space and which intersects the extended axis of rotation of the tool at right angles.

4. In a machine of the character described, the combination of a spindle-support formed with an offset portion at one end thereof, a driven spindle in said support, a tool carried in the offset portion of said support parallel to said spindle, means for driving said tool from said spindle, and means for oscillating the spindle-support about an axis that is perpendicular to a plane passing through the axes of the spindle and the tool, and which intersects the extended axis of the tool exteriorly of said offset portion of the spindle-support.

5. A combination as defined in claim 4 including means normally urging the spindle-support toward a determinate angular position about its axis of oscillation.

6. A combination as defined in claim 4 including a pendulous static weight so connected to the spindle-support as normally to urge the latter toward a determinate angular position upon its axis of oscillation.

7. In a machine of the character described, the combination of a rotatable engraving tool, means for rotating the same about its own axis, means for oscillating the tool about an axis existing in space exteriorly of the machine, a pendulous static weight so connected to the tool as normally to urge it toward a determinate angular position upon its axis of rotation, and means for adjusting the angular position of the weight with relation to the tool to alter the normal angular position of the latter on its axis of oscillation.

8. In a machine of the character described, the combination of a parallel motion mechanism including a pair of bell cranks, means for oscillating the latter about respective parallel axes, and an engraving device carried by the parallel motion mechanism and so positioned thereon as to be oscillated thereby upon oscillation of the bell cranks about an axis that is in the same plane as the axes of the bell cranks.

9. A combination as defined in claim 8 in which the engraving device is so positioned that its axis of oscillation exists in space, exteriorly of the device.

10. In a machine of the character described, the combination of a parallel motion mechanism including a pair of bell cranks, means for oscillating the latter about respective parallel axes, and an engraving device carried by the parallel motion mechanism and so arranged thereon as to be oscillated thereby, upon oscillation of the bell cranks, about an axis that exists in space, exteriorly of the device, said engraving device including an offset rotatable bit having an axis of rotation disposed radially of its axis of oscillation.

11. A combination as defined in claim 10 including a pendulous static weight secured to a bell-crank for normally urging the latter to a determinate angular position upon its axis.

12. In a machine of the character described, the combination of a pair of parallel links, a pair of bell-cranks connecting and supporting the same, respective rock-shafts upon which said bell-cranks are mounted, an engraving device mounted at one end of said links, and so positioned that oscillation of the bell-cranks will oscillate the engraving device about an axis that is disposed in the plane of the axes of the rock-shafts, and means for oscillating the bell-cranks in conformity to a determinate pattern.

13. A combination as defined in claim 12 in which the means for oscillating the bell-cranks comprises gearing whereby the size of the design engraved by the engraving device is a determinate proportion of the size of the pattern.

14. In a mold engraving machine, the combination of a parallel motion mechanism including a pair of bell-cranks, respective parallel shafts on which said bell-cranks are mounted, an engraving device carried by the parallel motion mechanism and so arranged thereon as to be oscillated thereby, upon oscillation of the bell-cranks, about an axis that exists in space exteriorly of the device, said engraving device comprising a bit and means for moving the bit axially toward and away from its axis of oscillation, and means for oscillating the bell-cranks in conformity to a determinate pattern, said means including a gear having a pitch diameter that is determinately proportional to the radius of oscillation of the bit.

THOMAS H. WILLIAMS.